United States Patent [19]

Cucheran

[11] Patent Number: 5,207,366
[45] Date of Patent: May 4, 1993

[54] SLAT ASSEMBLY FOR VEHICLE ARTICLE CARRIERS

[75] Inventor: John S. Cucheran, Lake Orion, Mich.

[73] Assignee: John A. Bott, Grosse Pointe Farms, Mich.

[21] Appl. No.: 852,732

[22] Filed: Mar. 16, 1992

Related U.S. Application Data

[63] Continuation of Ser. No. 609,823, Nov. 6, 1990, abandoned.

[51] Int. Cl.⁵ .............................................. B60R 9/00
[52] U.S. Cl. .................................... 224/326; 224/309
[58] Field of Search .............. 224/326, 325, 321, 309, 224/317, 322, 324, 320, 314; 160/201; 16/94 R, 95 R, 96 R; 410/104, 115, 130, 8

[56] References Cited

U.S. PATENT DOCUMENTS

| | | | |
|---|---|---|---|
| 3,060,489 | 10/1962 | Blackmer | 16/94 R |
| 4,182,471 | 1/1980 | Bott | 224/326 |
| 4,265,383 | 5/1981 | Ferguson | 224/326 |
| 4,364,500 | 12/1982 | Bott . | |
| 4,406,386 | 9/1983 | Rasor et al. . | |
| 4,460,116 | 7/1984 | Bott . | |
| 4,684,048 | 8/1987 | Bott . | |
| 4,754,905 | 7/1988 | Bott . | |
| 4,899,917 | 2/1990 | Bott . | |
| 4,911,348 | 3/1990 | Rasor et al. . | |
| 4,967,945 | 11/1990 | Bott . | |
| 4,972,983 | 11/1990 | Bott . | |
| 4,982,886 | 1/1991 | Cucheran . | |

FOREIGN PATENT DOCUMENTS

| | | |
|---|---|---|
| 3611136 | 10/1987 | Fed. Rep. of Germany . |
| 1007592 | 5/1952 | France ........................... 224/325 |

Primary Examiner—Linda J. Sholl
Attorney, Agent, or Firm—Harness, Dickey & Pierce

[57] ABSTRACT

The present invention is a slat assembly adapted to be mounted to a surface portion of a vehicle. The slat assembly include inner and outer rail members extending generally longitudinally and adapted to be fixedly secured on the surface portion of the vehicle. The inner and outer rail members cooperate with each other in an overlapping manner to vary the transverse width of the slat assembly.

14 Claims, 2 Drawing Sheets

SLAT ASSEMBLY FOR VEHICLE ARTICLE CARRIERS

This is a continuation of U.S. patent application Ser. No. 07/609,823, filed Nov. 6, 1990 now abandoned.

BACKGROUND OF THE INVENTION

1. Field of the Invention

The present invention relates generally to an article carrier for vehicles, and more particularly, to a slat assembly for an article carrier on an automotive vehicle.

2. Description of Related Art

Vehicle article carriers frequently employ two separate subassemblies or portions: a rectangular framework which surrounds the load to be carried and a plurality of slats which rest on the roof or other vehicle body portion and carries the weight of the load. In such constructions, the framework and the slats are often secured to the vehicle body independently of one another. In still another vehicle article or luggage carrier, a crossbar replaces the framework as a means for confining the articles upon the slats.

In prior U.S. Pat. No. 4,182,471, an article carrier for vehicles was disclosed having a slat forming a one-piece channel member and crossbars which can be adjusted on the slats and are easily removed, interchanged or adjusted in position on the slats in accordance with the needs of the user. This construction has achieved significant commercial success. Nevertheless, a need exists to provide a slat which may be molded from a plastic material and less costly to manufacture. Therefore, it is believed that a need exists for a slat which may be formed as separate members and can be assembled together as one piece. It is also believed that a need exists for a slat in which at least one of the separate members can be injection molded. It is further believed that a need exists for a slat that can be assembled from two pieces and has an attractive appearance of modern luggage carriers.

SUMMARY OF THE INVENTION

The present invention is a slat assembly adapted to be mounted on a surface portion of a vehicle. The slat assembly includes inner and outer rail members extending generally longitudinally and adapted to be fixedly secured on the surface portion of the vehicle. The inner and outer rail members include means for cooperating with each other in an overlapping manner to vary the transverse width of the slat assembly.

One advantage of the present invention is that a slat is provided which is attractive in appearance and easy to assemble. Another advantage of the present invention is that the slat can be molded of a plastic material, making the slat less costly to manufacture. Yet another advantage of the present invention is that the slat can be formed as separate members and can be assembled as one-piece. A further advantage of the present invention is that the slat assembly can be formed from two separate pieces in which one piece is formed from injection molding.

Other objects, features and advantages of the present invention will be readily appreciated as the same becomes better understood when viewed in light of the following description and accompanying drawings.

DESCRIPTION OF THE PREFERRED EMBODIMENT(S)

Figure 1:
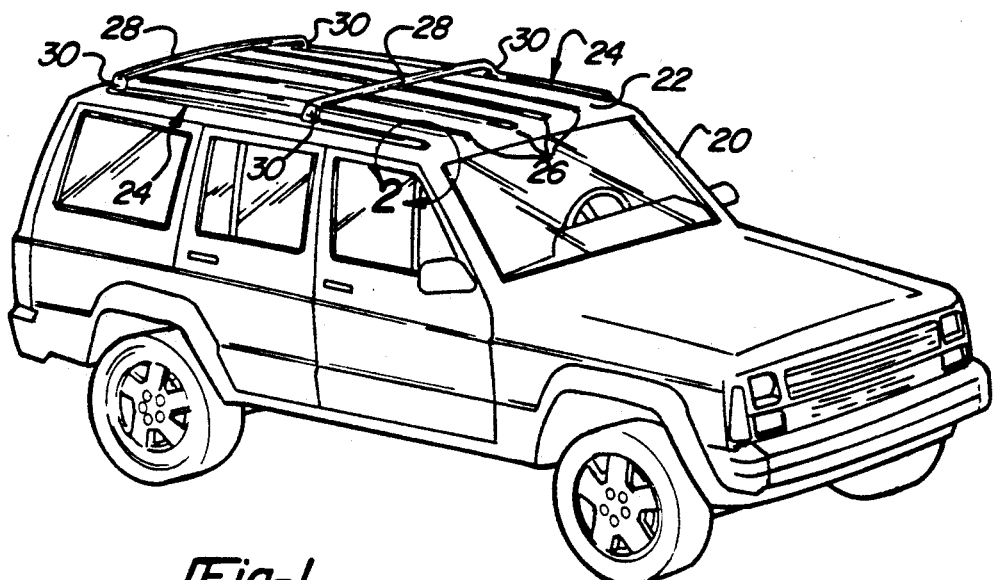
FIG. 1 is a perspective view of a vehicle illustrating an article carrier mounted thereon which is constructed in accordance with the principles of the present invention.

FIG. 1 depicts a vehicle 20 such as an automobile having a generally horizontal roof 22 on which are mounted a pair of identical, parallel, transversely spaced side rails, slats or slat assemblies, generally indicated at 24. Although the slat assemblies 24 are shown mounted on the roof 22, the slat assemblies 24 of the present invention forming an article carrier may be mounted with equal utility on a trunk lid or any other generally horizontal exterior body portion of a vehicle. Mounted on the roof 22 are a plurality of identical, parallel, transversely spaced support slats 26. The support slats 26 are disposed between the slat assemblies 24 such that the support slats 26 are transversely spaced between the slat assemblies 24.

Mounted on the slat assemblies 24 are a pair of raised tubular restraining bars or crossbars 28 which are fitted at their opposite ends onto stanchions, bracket member or brackets 30. The brackets 30 include a locking structure (not shown) for locking the crossbars 28 into position along the slat assemblies 24. The locking structure may comprise a clamp and an adjustable wheel. The locking structure allows the crossbars 28 to be positioned operably at any location or at predetermined locations along the length of the slat assemblies 24.

Figure 2:
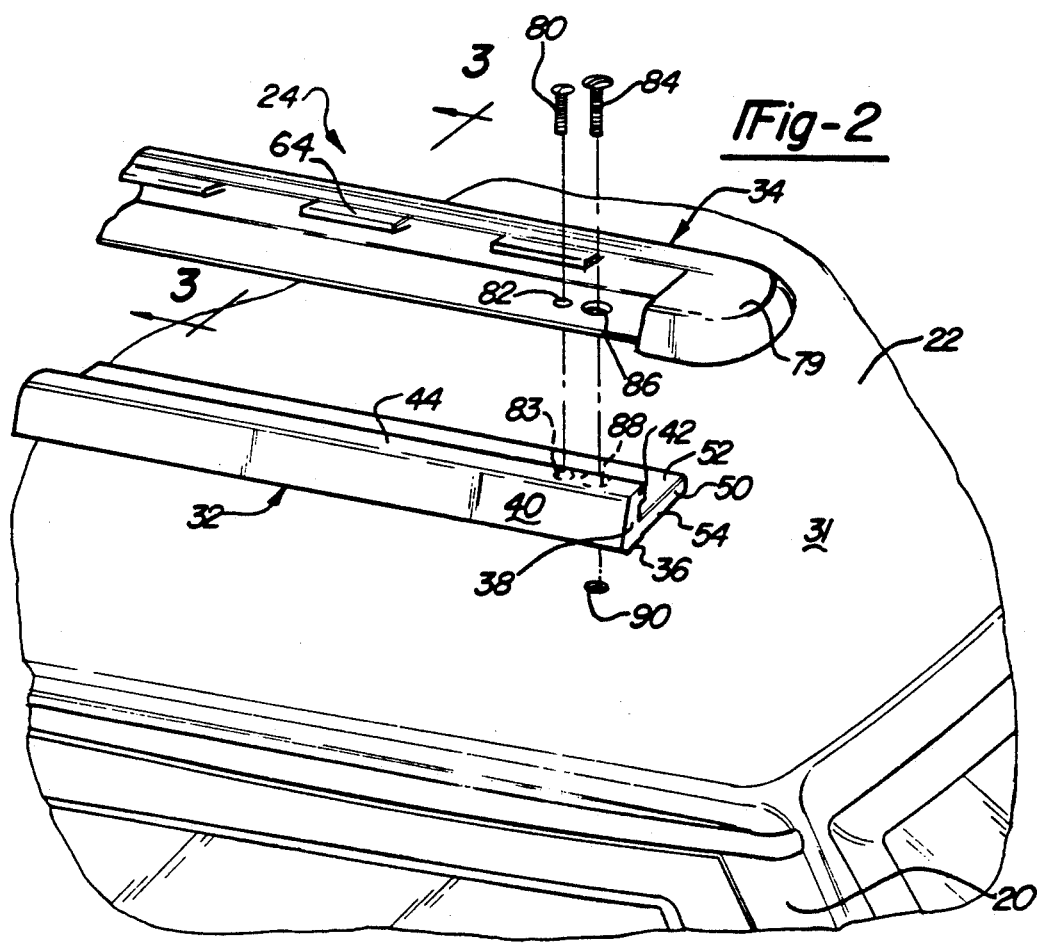
FIG. 2 is an enlarged perspective view of a portion of the structure illustrated in circle 2 of FIG. 1.
Figure 3:
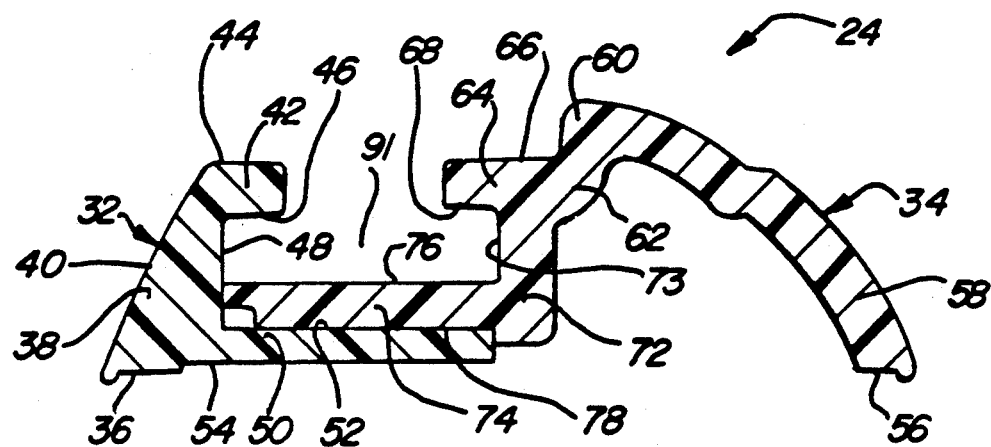
FIG. 3 is a sectional view taken along line 3—3 of FIG. 2.

Referring to FIGS. 2 and 3, only a portion of the slat assembly 24 and roof 22 are illustrated. The slat assembly 24 includes an inner rail member, generally indicated at 32, and an outer rail member, generally indicated at 34. The inner and outer rail members 32 and 34 extend generally longitudinally. The inner rail member 32 and outer rail member 34 are preferably molded of a plastic material by conventional injection molding.

The inner rail member 32 includes a bottom portion 36 and a side portion 38 extending upwardly from the bottom portion 36. The side portion 38 has an outer surface 40 curving gradually upwardly and inwardly in diverging relation to the bottom portion 36. The inner rail member 32 also includes an inwardly extending ledge 42 at the upper end of the side portion 38. The ledge 42 includes an article supporting surface 44 and an upper inner surface 46 spaced generally vertically below the article supporting surface 44. It should be appreciated that the article supporting surface 44 is adapted to support either the bracket 30 or articles disposed on the slat assembly 24.

The side portion 38 of the inner rail member 32 has a generally vertical inner side surface 48 spaced transversely between the outer surface 40 and the ledge 42. The inner rail member 32 further includes a generally horizontal channel wall 50 extending transversely inwardly from the side portion 38 at a lower end of the inner side surface 48. The channel wall 50 has an upper surface 52 and a lower surface 54 spaced generally vertically below the upper surface 52. It should be appreciated that the bottom portion 36 and lower surface 54 are adapted to rest upon the vehicle body surface 31.

The outer rail member 34 includes a bottom portion 56 adapted to rest upon the vehicle body surface 31. The outer rail member 34 also includes an upper and outer side portion 58 curving gradually upwardly and inwardly in diverging relation to the bottom portion 56 to an upper end 60. The upper end 60 of the upper and outer side portion 58 has a downwardly extending portion 62 and an inwardly extending and generally horizontal ledge 64. The ledge 64 includes an article supporting surface 66 and an upper inner surface 68 spaced generally vertically below the article supporting surface 66. The ledge 64 may include a plurality of notches 70 defined therein and spaced along the longitudinal length thereof. The notches 70 are generally rectangular in shape and extend transversely from the free end of the ledge 64. It should be appreciated that a spring member having a generally L-shaped end may cooperate with the ledge 64. It should also be appreciated that the article supporting surface 66 is adapted to support either the bracket 30 or articles disposed on the slat assembly 24.

The outer rail member 34 further includes a generally vertical inner wall 72 extending downwardly from the ledge 64 and having an inner wall surface 73 spaced transversely outwardly from the ledge 64. The outer rail member 34 also includes a generally horizontal channel wall 74 extending transversely inwardly from the inner wall 72 near a lower end of the inner wall surface 75. The channel wall 74 has an upper surface 76 and a lower surface 78 spaced generally vertically below the upper surface 76 and generally vertically above the free end of the inner wall 72. The lower surface 78 is adapted to engage or rest upon the upper surface 52 of the channel wall 50 for the inner rail member 32. The lower end of the inner wall surface 73 is adapted to extend partially along the end of the channel wall 50 for the inner rail member 32.

Referring to FIG. 2, the outer rail member 34 also includes an end cap portion 79, preferably, at each end thereof. The end cap portion 79 is integral with the outer rail member 34 and has an arcuate and aerodynamic appearance. The end cap portion 79 is adapted to close the end of the inner and outer rail members 32 and 34 when assembled together.

The slat assembly 24 also includes a secondary fastener 80 which extends through an aperture 82 in the channel wall 74 of the outer rail member 34 and into a corresponding aperture 83 of the inner rail member 32 to secure the outer rail member 34 to the inner rail member 32. The slat assembly 24 further includes a main fastener 84 which extends through apertures 86 and 88 in the channel walls 50 and 74 of the outer and inner rail member 34 and 32, respectively, and through an aperture 90 in the roof 22 to secure the inner and outer rail members 32 and 34 to the roof 22. It should be appreciated that the fasteners 80 and 84 may be sheet metal screws, pop rivets, rivet nuts or the like. It should also be appreciated that the channel walls 50 and 74 may be moved transversely relative to each other in an overlapping manner to vary the width of the slat assembly. Once this occurs, the inner and outer rail members 32 and 34 form a channel 91 being wider at its bottom than at its top. The apertures 82, 83, 86 and 88 may then be drilled to allow the slat assembly 24 to be secured to the roof 22.

Figure 4:
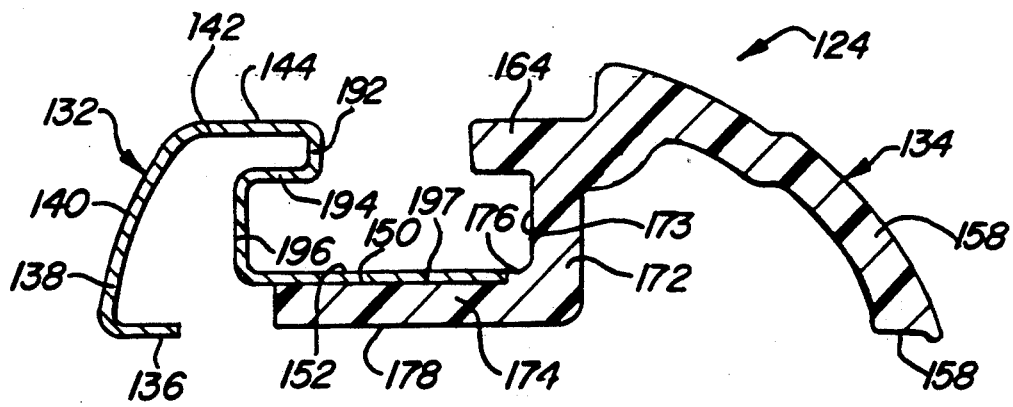
FIG. 4 is a view similar to FIG. 3 illustrating an alternate embodiment.

Referring to FIG. 4, an alternate embodiment 124 of the slat assembly 24 is shown. Like parts of the slat assembly 24 have like numerals increased by one hundred (100). In this embodiment, the inner rail member 132 is made from roll formed steel. The outer rail member 134 is made of plastic material formed by conventional injection molding. The outer rail member 134 includes the channel wall 174 extending transversely inwardly from the lower end of the inner wall surface 173. The bottom portion 156 and lower surface 178 of the channel wall 174 are adapted to rest upon the vehicle body surface 31.

The inner rail member 132 includes a generally vertical wall 192 extending downwardly from a free end of the ledge 142. The inner rail member 132 also includes a generally horizontal wall 194 extending transversely outwardly and a generally vertical inner wall 196 extending downwardly from the free end of the horizontal wall 194. The channel wall 150 extends transversely inwardly from a lower end of the inner wall 196. The channel wall 150 is adapted to rest in a recess 197 formed in the upper surface 176 such that the upper surface 192 is flush with the upper surface 176. It should be appreciated that the inner rail member 132 is formed as an integral one-piece continuous member. It should also be appreciated that the assembly of the embodiment 124 is the same as that previously described for FIGS. 2 and 3.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A vehicle article carrier adapted to be mounted to a surface portion of a vehicle, comprising:

a pair of slat assemblies each including inner and outer rail members extending generally longitudinally along the surface portion and adapted to be fixedly secured on the surface portion of the vehicle; and a cross bar disposed perpendicular to said slat assemblies and generally parallel to said surface portion of said vehicle for supporting articles elevationally above the surface portion;

a pair of bracket members secured to opposite ends of said cross bar and adapted to be adjustably secured to said slat assemblies at a plurality of positions along said slat assemblies;

said inner and outer rail members of each slat assembly each including means for cooperating with each other in an overlapping manner to vary the transverse width of each said slat assembly to thereby enable said inner and outer rail members to form a channel of a desired width, wherein said channel accommodates one of said bracket members therein.

2. A slat assembly as set forth in claim 1 wherein said outer rail member is made of a plastic material.

3. A slat assembly as set forth in claim 1 wherein said inner rail member is made of a plastic material.

4. A slat assembly as set forth in claim 1 wherein said inner and outer rail members are made of a plastic material.

5. A slat assembly as set forth in claim 1 wherein said outer rail member is made of a plastic material and said inner rail member is made of a roll formed steel material.

6. A slat assembly as set forth in claim wherein said inner rail member comprises a bottom portion, a side portion extending upwardly from said bottom portion, and a ledge extending inwardly from an upper end of said side portion.

7. A slat assembly as set forth in claim 6 wherein said outer rail member comprises a bottom portion, a side portion extending upwardly and inwardly from said bottom portion, and a ledge extending inwardly from said side portion.

8. A slat assembly as set forth in claim 7 wherein said inner and outer rail members include a downwardly extending inner wall portion.

9. A slat assembly as set forth in claim 8 wherein said overlapping means comprises a channel wall extending inwardly from said inner wall portion.

10. A slat assembly as set forth in claim 2 wherein said ledge of said outer rail member includes means defining a plurality of notches longitudinally spaced along said ledge.

11. A vehicle article carrier adapted to be mounted to a surface portion of a vehicle, comprising:
 a slat assembly including inner and outer rail members extending generally longitudinally and adapted to be fixedly secured on the surface portion of the vehicle;
 said inner and outer rail members cooperating with each other in an overlapping manner to vary the transverse width of said slat assembly;
 said outer rail member comprising a plastic material;
 said inner rail member comprising a bottom portion, a side portion extending upwardly from said bottom portion, and a ledge extending inwardly from an upper end of said side portion in a first direction;
 said outer rail member comprising a bottom portion, a side portion extending upwardly from said bottom portion, and a ledge extending inwardly from said side portion in a second direction opposite to said first direction and protruding towards said ledge of said inner rail member;
 said inner and outer rail members each including a downwardly extending inner wall portion and a channel wall extending inwardly from said downwardly extending inner wall portions to form a channel having a variable width;
 a cross bar extending perpendicular to said slat assembly;
 a bracket member coupled to an end of said cross bar and adapted to be adjustably secured at a plurality of positions along said slat assembly;
 said ledges of each of said inner and outer rail members both cooperating to help maintain a portion of a mounting bracket captively within said channel formed therebetween.

12. A vehicle article carrier adapted to be mounted to a surface portion of a vehicle, comprising:
 a slat assembly including inner and outer rail members extending generally longitudinally and adapted to be fixedly secured on the surface portion of the vehicle, said inner and outer rail members cooperating with each other in an overlapping manner to vary the transverse width of said slat assembly;
 a cross bar extending perpendicular to said slat assembly;
 a bracket member secured to an end of said cross bar and adapted to be adjustably secured at a plurality of positions along said slat assembly;
 said inner and outer rail members being made of a plastic material;
 said inner rail member comprising a bottom portion, a side portion extending upwardly from said bottom portion, and a ledge extending inwardly in a first direction from an upper end of said side portion;
 said outer rail member comprising a bottom portion, a side portion extending upwardly and inwardly from said bottom portion, and a ledge extending inwardly from said side portion in a second direction longitudinally opposite to said first direction toward said ledge of said inner rail member;
 said inner and outer rail members each including a downwardly extending inner wall portion and a channel wall extending inwardly from said downwardly extending inner wall portions, said ledges of said inner and outer rail members terminating to define a single, upwardly opening channel adapted to slidably support therein a portion of said bracket member, said bracket member being shaped generally complimentarily to said channel, and wherein said ledges operate cooperatively to help captively maintain said bracket member within said channel.

13. A vehicle article carrier adapted to be mounted to a surface portion of a vehicle, comprising:
 a slat assembly including inner and outer rail members extending generally longitudinally along the surface portion and adapted to be fixedly secured on the surface portion of the vehicle, said inner and outer rail members cooperating with each other in an overlapping manner to vary the transverse width of said slat assembly;
 a cross bar extending perpendicular to said slat assembly;
 a bracket member coupled to an end of said cross bar and adapted to be adjustably secured at a plurality of positions along said slat assembly;
 said outer rail member is made of a plastic material and said inner rail member is made of a roll formed steel material;
 said inner rail member comprising a bottom portion, a side portion extending upwardly from said bottom portion, and a ledge extending inwardly in a first direction from an upper end of said side portion;
 said outer rail member comprising a bottom portion, a side portion extending upwardly from said bottom portion, and a ledge extending inwardly in a second direction longitudinally opposite to said first direction from said side portion towards said ledge of said inner rail member;
 said inner and outer rail members each including a downwardly extending inner wall portion and a channel wall extending inwardly from said downwardly extending inner wall portions, said ledges of said inner and outer rail members terminating to define a generally inverted, T-shaped channel adapted to slidably support therein a portion of said bracket member, wherein said bracket member includes a generally T-shaped configuration, and wherein said ledges operate cooperatively to help maintain said portion of said bracket member therein.

14. A vehicle article carrier adapted to be mounted to a surface portion of a vehicle, comprising:

a pair of slat assemblies each including inner and outer rail members extending generally longitudinally along the surface portion and adapted to be fixedly secured on the surface portion of the vehicle;

said inner rail member comprising a bottom portion, a side portion extending upwardly from said bottom portion, and a ledge extending inwardly from an upper end of said side portion in a first direction;

said outer rail member comprising a bottom portion, a side portion extending upwardly from said bottom portion, and a ledge extending inwardly from said side portion in a second direction generally longitudinally opposite to said first direction and protruding toward said ledge of said inner rail member;

said ledges of each of said inner and outer rail members both cooperating to help maintain a portion of a mounting bracket captively within said channel formed therebetween; and said inner and outer rail members each including means for cooperating with each other in an overlapping manner to vary the transverse width of each said slat assembly to thereby enable said inner and outer rail members to form channels each having a desired width.

* * * * *